(12) United States Patent
Harr et al.

(10) Patent No.: US 9,453,768 B2
(45) Date of Patent: Sep. 27, 2016

(54) METHOD OF MAKING A MOLDED THERMOMETER PROBE COMPONENT

(71) Applicant: COVIDIEN AG, Neuhausen Am Rheinfall (CH)

(72) Inventors: James Harr, Wentzville, MO (US); Joseph T. Gierer, Glen Carbon, IL (US)

(73) Assignee: Covidien AG (CH)

( * ) Notice: Subject to any disclaimer, the term of this patent is extended or adjusted under 35 U.S.C. 154(b) by 407 days.

(21) Appl. No.: 13/932,199

(22) Filed: Jul. 1, 2013

(65) Prior Publication Data

US 2013/0326872 A1    Dec. 12, 2013

Related U.S. Application Data

(62) Division of application No. 11/967,488, filed on Dec. 31, 2007, now Pat. No. 8,496,377.

(51) Int. Cl.
*H01K 3/22*    (2006.01)
*G01K 13/00*    (2006.01)
*G01K 1/14*    (2006.01)

(52) U.S. Cl.
CPC ............. *G01K 13/002* (2013.01); *G01K 1/14* (2013.01); *Y10T 29/49002* (2015.01); *Y10T 29/4913* (2015.01); *Y10T 29/49146* (2015.01)

(58) Field of Classification Search
CPC ............ Y10T 29/49002; Y10T 29/49087; Y10T 29/49098; Y10T 29/49101; Y10T 29/49146; G01K 13/002
USPC ............. 29/848, 825, 832, 841, 854, 874; 374/163, 170, 185, 208, 209, E7.028, 374/E13.002

See application file for complete search history.

(56) References Cited

U.S. PATENT DOCUMENTS

| | | | |
|---|---|---|---|
| 3,283,580 | A | 11/1966 | Nanigian et al. |
| 3,702,076 | A | 11/1972 | Georgi |
| 3,729,998 | A | 5/1973 | Mueller et al. |
| 3,832,669 | A | 8/1974 | Mueller et al. |

(Continued)

FOREIGN PATENT DOCUMENTS

| | | |
|---|---|---|
| EP | 1039281 A1 | 9/2000 |
| EP | 2075559 B1 | 10/2014 |

(Continued)

OTHER PUBLICATIONS

European Search Report, European Application No. 08169983.7, dated Sep. 5, 2011, 6 pgs.
European Search Report dated Feb. 24, 2015 in related European application serial No. 14188872.7, 4 pages.

*Primary Examiner* — Thiem Pham (57) ABSTRACT

A medical measurement device, such as an electronic thermometer, having a probe. The probe includes a molded plastic substrate having a conductive circuit pattern formed directly on its surface. The circuit pattern extends at least from a first end margin of the molded plastic substrate to a second end margin opposite the first. The device also includes a sensor mounted on the molded plastic substrate for detecting a physiological parameter, such as temperature. The sensor is positioned on the molded plastic substrate at the first end margin by at least one positioning element integrally formed in the substrate. The conductive circuit pattern provides an electrical connection between the sensor and a processor.

20 Claims, 10 Drawing Sheets

(56) References Cited

U.S. PATENT DOCUMENTS

| | | |
|---|---|---|
| 3,893,058 A | 7/1975 | Keith |
| 3,915,003 A | 10/1975 | Adams |
| 4,008,614 A | 2/1977 | Turner et al. |
| 4,036,211 A | 7/1977 | Veth et al. |
| 4,054,057 A | 10/1977 | Kluge |
| 4,112,762 A | 9/1978 | Turner et al. |
| 1,413,348 A | 3/1979 | Hoge |
| 4,143,348 A | 3/1979 | Hoge |
| 4,159,766 A | 7/1979 | Kluge |
| 4,161,880 A | 7/1979 | Prosky |
| 4,183,248 A | 1/1980 | West |
| 4,282,507 A | 8/1981 | Tindall et al. |
| 4,307,373 A | 12/1981 | Johnston |
| 4,317,367 A | 3/1982 | Schonberger |
| 4,411,266 A | 10/1983 | Cosman |
| 4,411,535 A | 10/1983 | Schawarzchild |
| 4,420,738 A | 12/1983 | Rehmann et al. |
| 4,437,084 A | 3/1984 | Clayton, Jr. |
| 4,447,884 A | 5/1984 | Wada |
| 4,464,067 A | 8/1984 | Hanaoka |
| 4,487,208 A | 12/1984 | Kamens |
| 4,531,842 A | 7/1985 | Schonberger |
| 4,536,851 A | 8/1985 | Germanton et al. |
| 4,572,365 A | 2/1986 | Bruno et al. |
| 4,574,359 A | 3/1986 | Ishizaka et al. |
| 4,592,000 A | 5/1986 | Ishizaka et al. |
| 4,602,871 A | 7/1986 | Hanaoka |
| 4,629,336 A | 12/1986 | Ishizaka |
| 4,642,785 A | 2/1987 | Packard et al. |
| 4,727,500 A | 2/1988 | Jackson et al. |
| 4,728,199 A | 3/1988 | Murai et al. |
| 4,729,672 A | 3/1988 | Takagi |
| 4,733,974 A | 3/1988 | Hagerman |
| 4,735,512 A | 4/1988 | Suzuki |
| 4,762,429 A | 8/1988 | Fujikawa |
| 4,771,791 A | 9/1988 | Kubouchi |
| 4,811,198 A | 3/1989 | Ota et al. |
| 4,843,577 A | 6/1989 | Muramoto |
| 4,866,621 A | 9/1989 | Ono |
| 4,878,184 A | 10/1989 | Okada et al. |
| D309,866 S | 8/1990 | Fukuda et al. |
| 4,986,669 A | 1/1991 | Yamaguchi |
| 4,988,212 A | 1/1991 | Sun et al. |
| 5,011,294 A | 4/1991 | Yamaguchi |
| 5,013,161 A | 5/1991 | Zaragoza et al. |
| 5,037,488 A | 8/1991 | Wienand |
| 5,066,141 A | 11/1991 | Ikeda et al. |
| 5,116,136 A | 5/1992 | Newman et al. |
| 5,133,606 A | 7/1992 | Zaragoza et al. |
| 5,142,266 A | 8/1992 | Friese et al. |
| 5,149,200 A | 9/1992 | Shiokawa et al. |
| 5,165,798 A | 11/1992 | Watanabe |
| 5,178,468 A | 1/1993 | Shiokawa et al. |
| 5,193,912 A | 3/1993 | Saunders |
| 5,207,765 A | 5/1993 | Eiermann et al. |
| 5,259,389 A | 11/1993 | Muramoto et al. |
| 5,305,381 A | 4/1994 | Wang et al. |
| 5,307,263 A | 4/1994 | Brown |
| 5,370,459 A | 12/1994 | Culbertson et al. |
| 5,388,134 A | 2/1995 | Douglass et al. |
| 5,392,031 A | 2/1995 | Toriumi et al. |
| 5,417,207 A | 5/1995 | Young et al. |
| 5,438,322 A | 8/1995 | Martin et al. |
| 5,445,154 A | 8/1995 | Larson et al. |
| 5,458,121 A | 10/1995 | Harada |
| 5,473,629 A | 12/1995 | Muramoto |
| 5,473,937 A | 12/1995 | McCluskey et al. |
| 5,497,139 A | 3/1996 | Takahashi et al. |
| 5,513,235 A | 4/1996 | Douglass et al. |
| 5,575,563 A | 11/1996 | Chiu |
| 5,632,555 A | 5/1997 | Gregory et al. |
| 5,700,416 A | 12/1997 | Masui et al. |
| 5,725,308 A | 3/1998 | Smith et al. |
| 5,738,441 A | 4/1998 | Cambridge et al. |
| 5,749,656 A | 5/1998 | Boehm et al. |
| D395,609 S | 6/1998 | Knieriem et al. |
| 5,789,920 A | 8/1998 | Gass |
| 5,820,263 A | 10/1998 | Ciobanu |
| 5,883,646 A | 3/1999 | Beauchamp |
| 5,887,338 A | 3/1999 | Wildgen |
| 5,961,451 A | 10/1999 | Reber et al. |
| 6,000,846 A | 12/1999 | Gregory et al. |
| 6,006,120 A | 12/1999 | Levin |
| 6,068,399 A | 5/2000 | Tseng |
| 6,091,317 A | 7/2000 | Lyle et al. |
| 6,147,335 A | 11/2000 | Von Arx et al. |
| 6,236,880 B1 | 5/2001 | Raylman |
| 6,241,146 B1 | 6/2001 | Wienand et al. |
| 6,251,107 B1 | 6/2001 | Schafer |
| 6,280,397 B1 | 8/2001 | Yarden et al. |
| 6,286,995 B1 | 9/2001 | Takahashi et al. |
| 6,293,700 B1 | 9/2001 | Lund et al. |
| 6,297,723 B1 | 10/2001 | Shoji et al. |
| 6,319,448 B1 | 11/2001 | Kirchdoerffer et al. |
| 6,337,470 B1 | 1/2002 | Von Arx et al. |
| 6,383,144 B1 | 5/2002 | Mooney et al. |
| 6,418,359 B1 | 7/2002 | Wolf et al. |
| 6,494,830 B1 | 12/2002 | Wessel |
| 6,511,478 B1 | 1/2003 | Burnside et al. |
| 6,534,994 B1 | 3/2003 | Doderer et al. |
| 6,568,849 B1 | 5/2003 | Chen et al. |
| 6,588,931 B2 | 7/2003 | Betzner et al. |
| 6,591,703 B2 | 7/2003 | Gass et al. |
| 6,637,935 B2 | 10/2003 | Chen |
| 6,639,505 B2 | 10/2003 | Murata |
| 6,686,828 B2 | 2/2004 | Bernitz et al. |
| 6,698,922 B2 | 3/2004 | Adachi et al. |
| 6,699,188 B2 | 3/2004 | Wessel |
| 6,730,025 B1 | 5/2004 | Platt |
| 6,746,150 B2 | 6/2004 | Wienand et al. |
| 6,756,585 B2 | 6/2004 | Damaschke |
| 6,782,744 B1 | 8/2004 | Tashiro et al. |
| 6,789,936 B1 | 9/2004 | Kraus et al. |
| 6,827,487 B2 | 12/2004 | Baumbach |
| 6,827,488 B2 | 12/2004 | Knieriem et al. |
| 6,836,651 B2 | 12/2004 | Segal et al. |
| 6,839,651 B2 | 1/2005 | Lantz et al. |
| 6,854,880 B2 | 2/2005 | Hsieh |
| 6,899,457 B2 | 5/2005 | Kurano |
| 6,918,696 B2 | 7/2005 | Hoshisashi et al. |
| 6,938,474 B2 | 9/2005 | Melvas |
| 6,939,039 B2 | 9/2005 | Brunvoll |
| 6,957,911 B2 | 10/2005 | Wong |
| 6,969,354 B1 | 11/2005 | Marian |
| 6,976,783 B2 | 12/2005 | Chen |
| 6,979,329 B2 | 12/2005 | Burnside et al. |
| 6,981,796 B2 | 1/2006 | Hsieh |
| 7,004,622 B2 | 2/2006 | Hardwicke et al. |
| 7,021,824 B2 | 4/2006 | Wawro et al. |
| 7,028,568 B2 | 4/2006 | Tokunaga et al. |
| 7,036,984 B2 | 5/2006 | Penney et al. |
| 7,115,850 B2 | 10/2006 | Niemann et al. |
| 7,255,475 B2 | 8/2007 | Quinn et al. |
| 7,267,547 B2 | 9/2007 | Schmid et al. |
| 7,303,332 B2 | 12/2007 | Yu |
| 7,314,310 B2 | 1/2008 | Medero |
| 7,374,336 B2 | 5/2008 | Fraden |
| 7,395,173 B2 | 7/2008 | Kautz et al. |
| 7,494,274 B2 | 2/2009 | Sisk et al. |
| 7,549,792 B2 | 6/2009 | Bisch et al. |
| 7,613,590 B2 | 11/2009 | Brown |
| 7,722,247 B2 | 5/2010 | Yerlikaya |
| 2002/0090020 A1 | 7/2002 | Yu |
| 2002/0109577 A1 | 8/2002 | Loose et al. |
| 2002/0135454 A1 | 9/2002 | Ichida et al. |
| 2002/0172258 A1 | 11/2002 | Adachi et al. |
| 2003/0002562 A1 | 1/2003 | Yerlikaya et al. |
| 2003/0058920 A1 | 3/2003 | Lyle |
| 2003/0065322 A1 | 4/2003 | Panescu et al. |
| 2003/0149349 A1 | 8/2003 | Jensen |
| 2003/0176810 A1 | 9/2003 | Maahs et al. |
| 2003/0212438 A1 | 11/2003 | Nova et al. |

(56) References Cited

U.S. PATENT DOCUMENTS

| | | |
|---|---|---|
| 2004/0071182 A1 | 4/2004 | Quinn et al. |
| 2004/0071188 A1 | 4/2004 | Knieriem et al. |
| 2004/0081225 A1 | 4/2004 | Janicek |
| 2004/0151229 A1 | 8/2004 | Ruettiger |
| 2005/0187487 A1 | 8/2005 | Azizkhan et al. |
| 2006/0061451 A1 | 3/2006 | Chen |
| 2006/0075815 A1 | 4/2006 | Tanaka et al. |
| 2006/0139037 A1 | 6/2006 | Hughes |
| 2006/0152238 A1 | 7/2006 | Beaman et al. |
| 2006/0239332 A1 | 10/2006 | Harr et al. |
| 2007/0098040 A1 | 5/2007 | Sisk et al. |
| 2007/0100253 A1 | 5/2007 | Sisk et al. |
| 2007/0189358 A1 | 8/2007 | Lane et al. |
| 2008/0294065 A1 | 11/2008 | Waldhoff et al. |
| 2009/0118618 A1 | 5/2009 | Harhen |
| 2010/0006327 A1 | 1/2010 | Yu et al. |

FOREIGN PATENT DOCUMENTS

| | | |
|---|---|---|
| FR | 2580806 A1 | 10/1986 |
| GB | 2266771 A | 11/1993 |
| GB | 22668771 A | 11/1993 |
| GB | 2284566 A | 6/1995 |
| JP | 01312432 A | 12/1989 |
| JP | 02049129 A | 2/1990 |
| JP | 6241914 A | 9/1994 |
| JP | 09089680 A | 4/1997 |
| JP | 11030553 | 2/1999 |
| JP | 11-173922 A | 7/1999 |
| JP | 2006186357 | 7/2006 |
| WO | 0131305 A1 | 5/2001 |
| WO | 03002966 A1 | 1/2003 |
| WO | 2004107989 A1 | 12/2004 |

METHOD OF MAKING A MOLDED THERMOMETER PROBE COMPONENT

CROSS REFERENCE TO RELATED APPLICATION

The present application is a divisional of U.S. application Ser. No. 11/967,488, filed Dec. 31, 2007, the entire disclosure of which is incorporated herein by reference for all purposes.

BACKGROUND

Electronic thermometers are widely used in the healthcare field for measuring a patient's body temperature. A typical electronic thermometer includes a sensor probe having an elongated shaft portion and a tip portion. The tip portion contains electronic temperature sensors, such as thermistors or other temperature-sensitive elements. Often, a covering (e.g., aluminum cap) for the tip portion makes thermal contact with the temperature sensitive elements contained within the tip portion. When the tip of the probe is placed, for example, in a patient's mouth, the patient's body heats the tip and the temperature sensor components sense the temperature of the tip.

A base unit typically houses additional electronic components for the thermometer. These components may be connected to the electronic temperature sensor components in the probe shaft by wires or the like. In some instances, a handle portion of the probe shaft contains electronics in addition to or instead of the base unit. The electronic components receive input from the temperature sensor components for generating an output representative of the patient's temperature. The thermometer usually displays this output to a user. Additional features of known electronic thermometers include audible temperature level notifications such as beeps or tone alert signals. A disposable cover or sheath is typically fitted over the shaft portion and disposed after each use of the thermometer for sanitary reasons.

The construction of the probe is important for ensuring accurate temperature measurements and repeatability during manufacturing. One known probe construction mounts the electronic components (e.g., the temperature sensitive elements) on a flexible substrate that supports and provides electrical connection for the components. The combination of the components and the flexible substrate is commonly called a "flex circuit". The substrate may be initially flat to facilitate ease of mounting the components, but can be bent into position upon assembly into the probe. For example, the flexible substrate may be bent to place a thermistor in position for contacting the probe tip covering. The components can be glued in place with a thermally conductive adhesive in the final assembly. However, before the adhesive is brought into contact with the components and/or before the adhesive sets, the components may undesirably move. The result of motion can be insufficient contact of the components with the tip and/or other parts of the probe to heat or sense temperature in the final assembly. Likewise, the components may be positioned incorrectly or with an unacceptable level of variability from one thermometer to another.

SUMMARY

Aspects of the invention provide a molded substrate in which at least one positioning element is integrally formed. The positioning element may be a recess or the like sized and shaped for receiving a sensing element therein. As such, aspects of the invention permit reliable and consistent positioning of a sensing element within a medical device probe. Advantageously, such aspects minimize assembly failures and achieve a highly repeatable assembly process. In addition, a conductive circuit pattern formed directly on the substrate's surface electrically connects the sensing element to other electronic components of the medical device. This eliminates the need for additional wiring or the like and, thus, improves reliability and ease of assembly.

In an aspect of the invention, an electronic thermometer has a probe adapted to be heated by a subject for use in measuring the temperature of the subject. The probe includes a molded plastic substrate that has a conductive circuit pattern formed directly on its surface. The circuit pattern extends at least from a first end margin of the molded plastic substrate to a second end margin opposite the first. The thermometer also includes a temperature sensor mounted on the molded plastic substrate for detecting the temperature of the probe. The temperature sensor is positioned on the molded plastic substrate at the first end margin by at least one positioning element integrally formed in the substrate. The conductive circuit pattern provides an electrical connection between the temperature sensor and a processor.

A method of making a sensor probe for an electronic thermometer embodying aspects of the invention includes injecting thermoplastic resin into one or more cavities to form a plastic substrate. At least one of the cavities defines a positioning element integrally formed in the plastic substrate at a first end margin. The method also includes forming a conductive circuit pattern directly on a surface of the plastic substrate from one end margin to the other, positioning a temperature sensor relative to the positioning element, and mounting the positioned temperature sensor on the plastic substrate. The conductive circuit pattern provides an electrical connection between the temperature sensor and a processor of the electronic thermometer for generating a temperature measurement as a function of a temperature detected by the temperature sensor.

A sensor probe for an electronic thermometer embodying aspects of the invention includes a molded interconnect device having an electrically conductive circuit pattern formed on at least one surface of the device and a temperature sensing element attached to the molded interconnect device and electrically connected to the electrically conductive circuit pattern.

In yet another aspect of the invention, a medical measurement device includes a sensor support having opposite first and second end margins and a sensing element attached to the support at the first end margin for sensing a physiological parameter. The support includes a plastic substrate having at least one positioning element integrally formed therein for positioning the sensing element on the plastic substrate at the first end margin of the support. The sensor probe also includes an electrically conductive circuit pattern formed directly on a surface of the support for electrically connecting the sensing element to a controller of the medical measurement device.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Other features will be in part apparent and in part pointed out hereinafter.

DETAILED DESCRIPTION

Aspects of the invention relate to a medical measurement device (e.g., electronic thermometer) for sensing a physiological parameter (e.g., temperature, flow rate, concentration, magnetic field force, pressure, weight, density, and other parameters associated with a physiological system). In particular, an embodiment of the invention includes a molded plastic substrate having opposite first and second ends. A sensing element for measuring the physiological parameter is mounted on the plastic substrate at a first end margin and conductive traces are applied to one or more surfaces of the substrate to electrically connect the sensing element to a controller of the medical measurement device.

Figure 1:
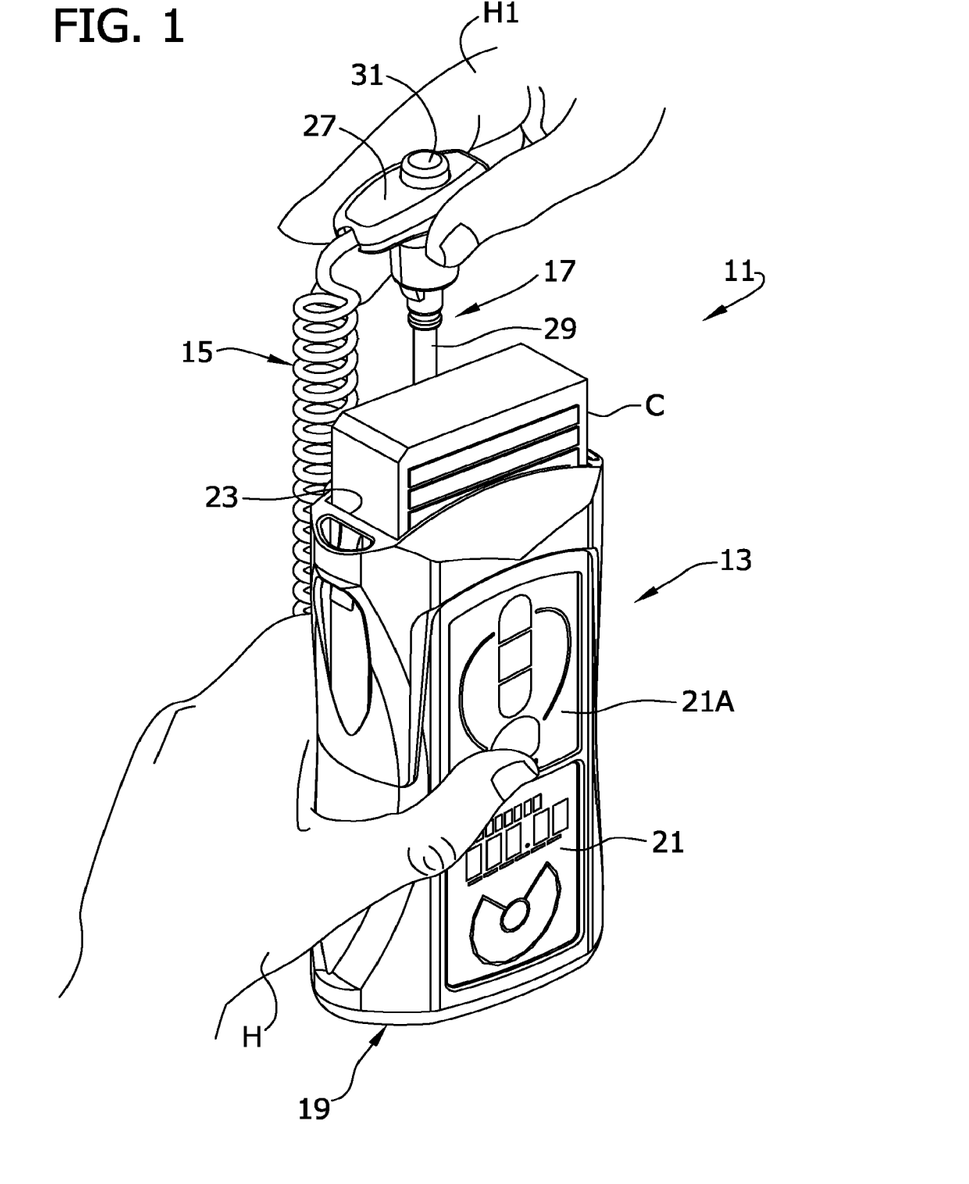
FIG. 1 is a perspective view of an electronic thermometer according to an embodiment of the invention.

Referring first to FIG. 1, an electronic thermometer constructed according to principles of the present invention is indicated generally at 11. The electronic thermometer comprises a temperature calculating unit, indicated generally at 13, that is sized and shaped to be held comfortably in a user's hand H. In the illustrated embodiment, the calculating unit 13 (broadly, "a base unit") is connected by a helical cord 15 or the like to a probe 17 (the reference numerals indicating their subjects generally). The probe 17 (broadly, "a support") contacts the object/subject (e.g., a patient or an area closely surrounding the patient) and conducts signals to base unit 13 representative of a temperature. The base unit 13 receives the signals from probe 17 via the cord 15 and uses them to calculate the temperature of the subject. Suitable circuitry (e.g., controller, processor) for performing these calculations is contained within a housing 19 of the base unit 13. In one embodiment, the logic in the circuitry includes a predictive algorithm for rapidly ascertaining a final temperature measurement for the patient based on the probe signals. The circuitry makes the calculated temperature appear on a display 21 (e.g., a liquid crystal display) on the front of the housing 19. The display 21 can also show other useful information, as will be appreciated by those of ordinary skill in the art. A panel 21A of buttons or other user interface devices (e.g., switches, toggles, knobs, dials, touch screens, keypads, etc.) for operating the thermometer 11 is located on base unit 13 (e.g., just above the display 21). As would be readily understood by one skilled in the art, other arrangements of the display and panel can be utilized without departing from the scope of embodiments of the invention.

Referring still to FIG. 1, the housing 19 includes a compartment, or slot, (not shown) generally at the rear of the housing that can receive a distal portion of the probe 17 into the housing for holding the probe and isolating the distal portion from the environment when not in use. As used herein, the terms "proximal" and "distal" are used to describe relative locations of structures of the probe 17 with respect to a user's hand H1 when the user is holding the probe 17. FIG. 1 illustrates probe 17 being pulled by the hand H1 from the compartment in preparation for use. The housing 19 also has a receptacle 23 that receives a suitable container such as a carton C of removable probe covers (not shown). In use, the top of the carton C is removed, exposing open ends of the removable probe covers. The distal portion of the probe 17 can be inserted into the open end of the carton C and one of the removable probe covers can be captured (e.g., snapped) into an annular recess. The distal portion of the probe 17 is protected from contamination by the removable cover when the distal portion of the probe 17 is inserted, for example, into a patient's mouth. A button 31 on a handle 27 of probe 17 can be depressed to cause pushers (not shown) to move for releasing the removable probe cover from the probe 17. Subsequent to use, the removable probe cover can be discarded. Other ways of capturing and releasing removable probe covers may be used without departing from the scope of the present invention.

Figure 2:
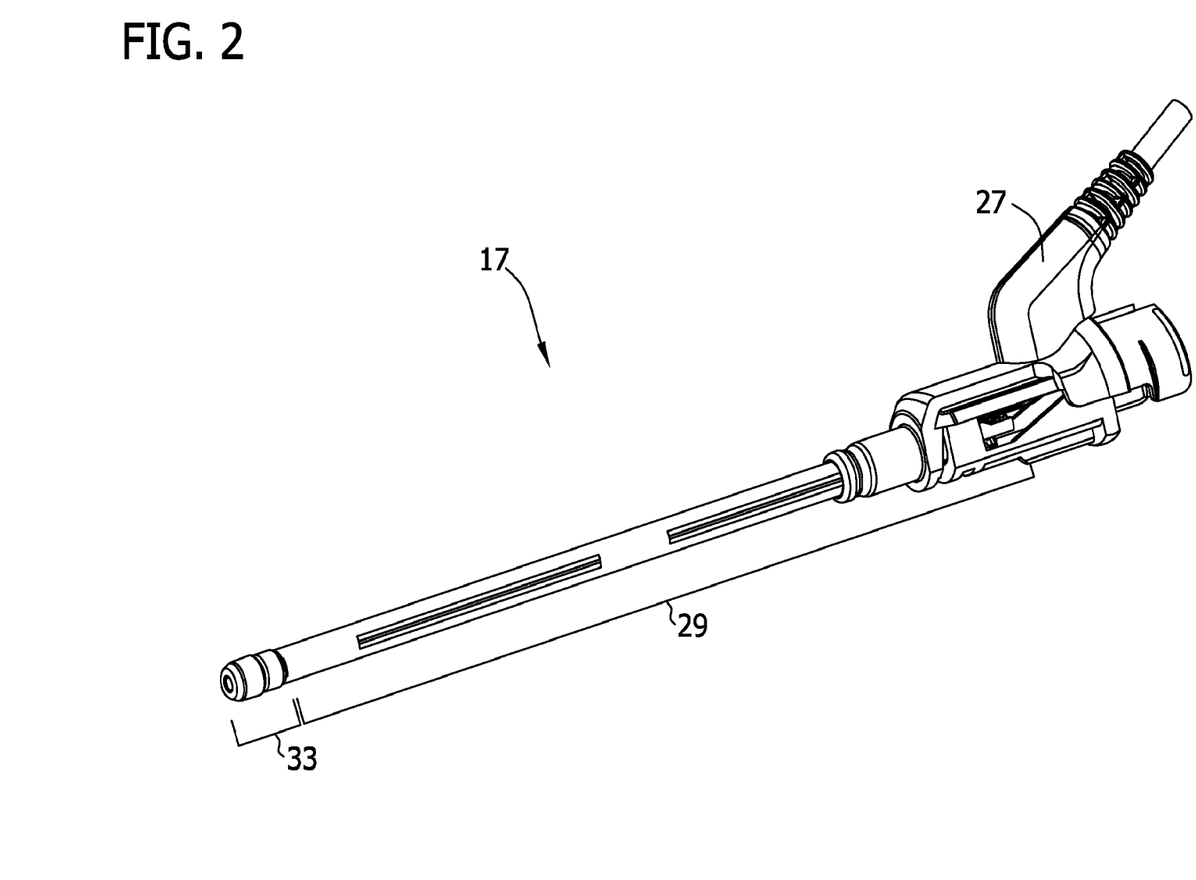
FIG. 2 is a perspective view of a probe of the electronic thermometer of FIG. 1
Figure 3A:
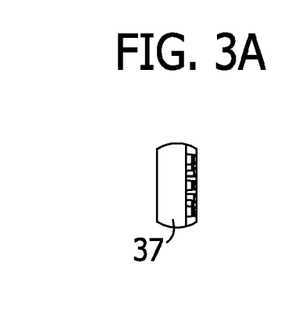
FIG. 3A is a rear orthogonal view of a probe for an electronic thermometer according to an embodiment of the invention
Figure 3B:
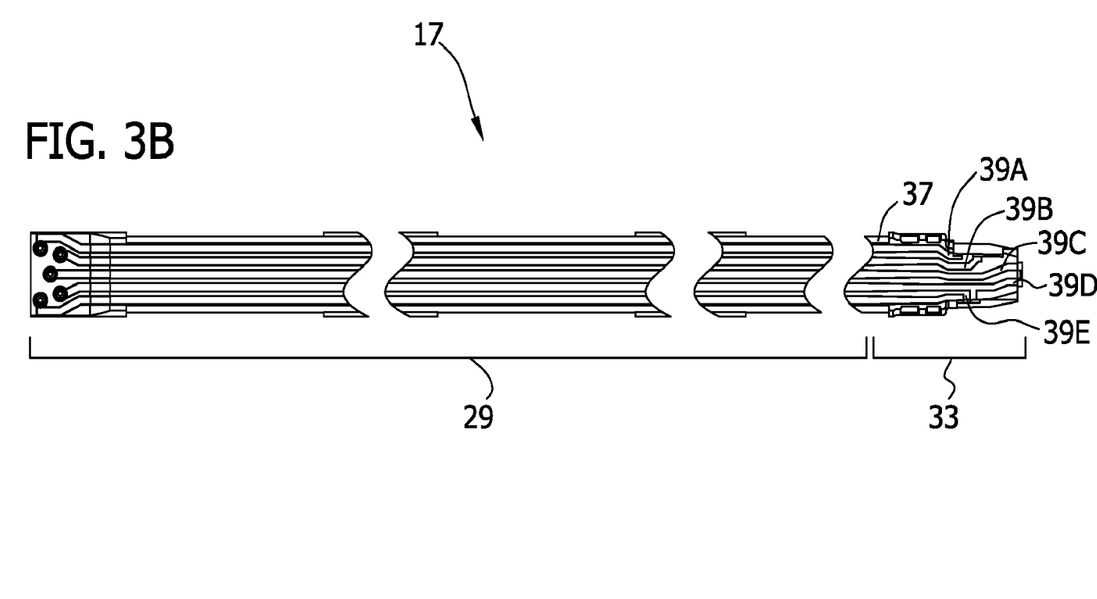
FIG. 3B is a top plan view of a probe for an electronic thermometer according to an embodiment of the invention.
Figures 3C, 3D:
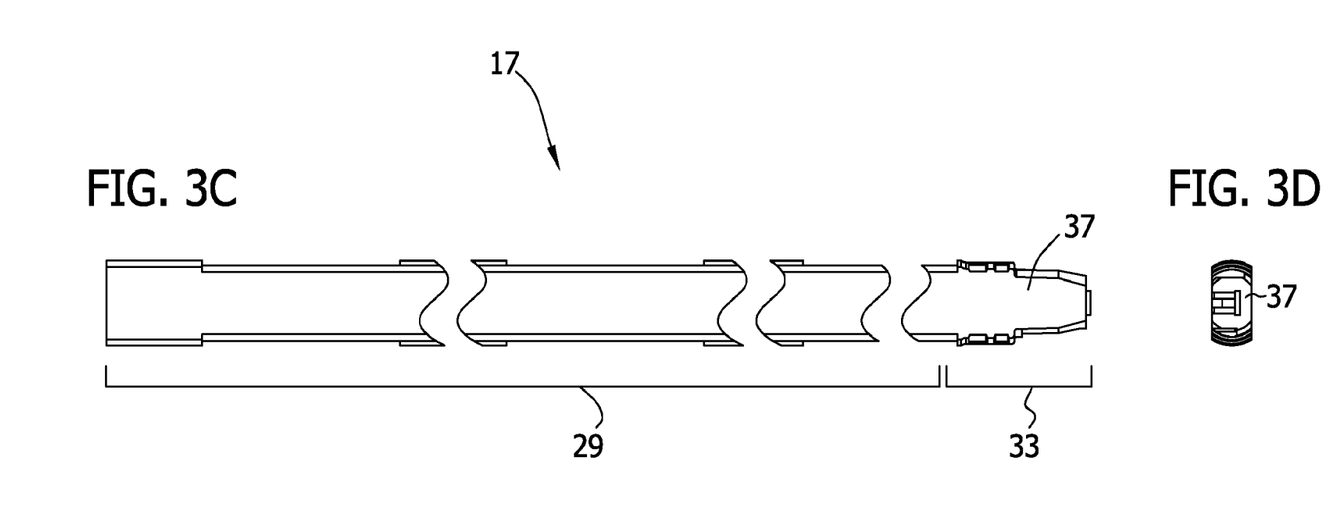
FIG. 3C is a front orthogonal view of a probe for an electronic thermometer according to an embodiment of the invention
FIG. 3D is a bottom plan view of a probe for an electronic thermometer according to an embodiment of the invention.

FIG. 2 illustrates a side perspective view of probe 17 for electronic thermometer 11 according to an embodiment of the invention. The probe 17 includes a probe shaft 29 (proximal portion/end of probe 17) connected to the base unit 13 via the cord 15 extending from the handle 27 and a probe tip 33 (distal portion/end of probe 17) for contacting the subject. In one embodiment, illustrated by FIGS. 3A-3D, the probe tip 33 includes a molded interconnect device for attaching a sensor (e.g., see temperature sensor 43 of FIG. 4) thereto. As appreciated by one skilled in the art, a molded interconnect device (MID) comprises a molded plastic substrate 37 (e.g., part, housing, body, component, support) which incorporates a conductive circuit pattern 39 on one or more surfaces of the substrate 37. In the illustrated embodiment, the conductive circuit pattern 39 includes electrically conductive traces 39A-39E (tracks) applied to (i.e., formed on) an exterior surface of the plastic substrate 37. In another embodiment, plastic substrate 37 has an interior cavity (not shown) and the conductive circuit pattern 39 is applied additionally or alternatively to one or more surfaces of the interior cavity of plastic substrate 37.

Although illustrated as having generally rectangular surfaces, the MID is not limited to any particular shape. For instance, molded substrate 37 may have a generally cylindrical, prismatic, and/or other three dimensional shape. The scope of the invention contemplates embodiments in which the MID has a shape which includes one or more functional design features. For example, the tip portion 33 may be shaped for effectively measuring a particular object, cavity, and/or medium. More specifically, the tip portion 33 of probe 17 may have a first shape when used for measuring the body temperature of adults and may have a second shape which is smaller than the first shape when used for measuring the body temperature of children. Similarly, the tip portion 33 of probe 17 may have an elongated cone shape for measuring the temperature of an ear cavity while the tip portion 33 of probe 17 may have a rectangular prismatic shape for measuring the temperature of a mouth cavity. Several examples are discussed herein.

Referring generally to FIGS. 3A-3D, in an embodiment, the MID is designed to form both the probe tip 33 and the probe shaft 29. In particular, probe tip 33 includes a first portion/end margin of the MID for attaching the temperature sensor 43, and the probe shaft 29 includes a remaining portion/end margin of the MID which is connected to the base unit 13 via cord 15. For example, the molded plastic substrate 37 of the MID may include an elongated portion to form probe shaft 29 for being held by a user H1 to locate the probe 17 with respect to the subject. The elongated portion of the MID forming the shaft 29 may be shaped to minimize breakage resulting from force applied to the probe 17. In another embodiment, the MID is designed to form the probe tip 33, and the probe 17 additionally includes a conductive substrate which forms the probe shaft 29. One end of the conductive substrate is connected to base unit 13 via cord 15 and the other end is attached to the MID. The conductive traces 39A-39E of the MID are electrically connected to the conductive substrate. For example, the conductive substrate may be flexible allowing the probe shaft 29 to be particularly configured for the subject. Particularly, the conductive substrate may include a copper component that is covered by an electrically insulating but deformable material. The conductive traces 39A-39E of the MID are electrically connected to the conductive substrate by penetrating the insulating cover to access the copper component.

Figure 4:
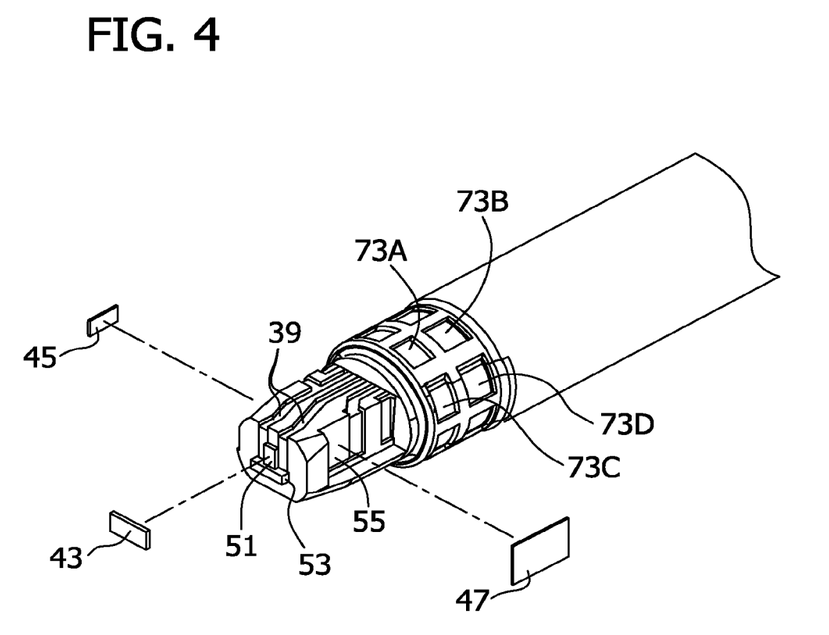
FIG. 4 is a side perspective view of a distal portion of a probe for an electronic thermometer according to an embodiment of the invention.

In an embodiment illustrated by FIG. 4, probe 17 includes electronic components (e.g., 43, 45, 47) mounted to the MID. In particular, the probe tip 33 includes the temperature sensor 43 mounted on the probe tip 33 end margin of the MID. In the illustrated embodiment, probe tip 33 also includes another temperature sensor 45 (referred to as a "heater temperature sensor 45") and a heating element 47, the purpose of which is explained below. For example, temperature sensors 43, 45 are each embodied by a thermistor and heating element 47 is embodied by a resistor. In the illustrated embodiment, the circuit pattern 39 includes one or more conductive receiving elements 51 for mounting the electronic components. Exemplary conductive receiving elements 51 include mounting pads, plug-in contacts, sliding contacts, fastener elements, etc. In an embodiment, the probe 17 additionally or alternatively includes a receiving agent (e.g., solder, solder paste, electrically conductive adhesive, etc.) for attaching the electronic components to the MID. For example, solder may attach and electrically connect the temperature sensors 43, 45 and the heating element 47 to respective mounting pads on the MID.

Still referring to FIG. 4, one or more surfaces of the MID includes one or more positioning elements 53 integrally formed in the molded plastic substrate 37 for positioning electronic components, such as the temperature sensor 43. The positioning element 53 allows electronic components to be accurately and efficiently located and attached. In an embodiment, the positioning element 53 includes a protrusion with respect to a surface of the molded plastic substrate 37 to engage one or more surfaces of the electronic component. In another embodiment, the positioning element 53 includes a recess (e.g., see positioning element 55) with respect to a surface of the molded plastic substrate 37 to engage one or more surface of the electronic component. For example, in the illustrated embodiment of FIG. 4, a first end margin of the MID (i.e., probe tip 33) includes positioning element 53 embodied by a shoulder protruding longitudinally from an end surface of the probe 17 for facilitating the mounting of temperature sensor 43. In this embodiment, positioning element 53 engages a bottom surface of the temperature sensor 43 when the temperature sensor 43 is placed on the mounting pad and attached to the MID. In another example, a pocket or other recess (see positioning element 55) may be incorporated into the MID surface for receiving an electronic component. The pocket advantageously allows the probe 17 to maintain a substantially smooth surface and protects the electronic component. As shown in FIG. 4, the electronic component 47 is positioned within a recess, i.e., positioning element 55, which is molded as part of the MID probe tip 33 for an accurate and repeatable placement of the component 47. This helps improve temperature accuracy because the component is fixed in its position and is secured against movement (e.g., due to dropping during use). The impact of this invention is the plastic formed substrate is capable of repeatable manufacturing and subject to close tolerances for the electrical connections and placement of the electronics, such as components 43, 45, 47.

Because a protrusion or recess forming the positioning element 53, 55 is part of the shape of the plastic substrate 37, the protrusion or recess is included in a mold used to manufacture the plastic substrate 37. Advantageously, the positioning element 53, 55 is consistently configured and requires no additional parts. It is to be understood that the positioning element 53, 55 does not have to structurally support the electronic component. For example the positioning element 53, 55 may be a marking on the surface of the MID which is optically indicative of the position of the electronic component.

Figure 5A:
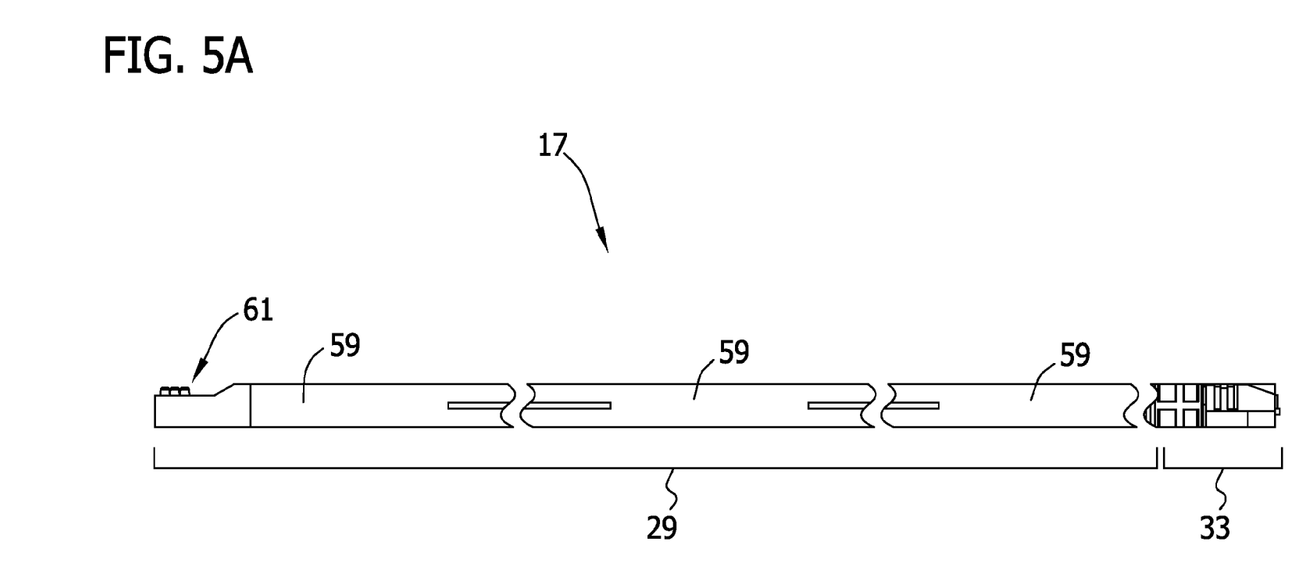
FIG. 5A is a side orthogonal view of a probe for an electronic thermometer according to an embodiment of the invention.
Figure 5B:
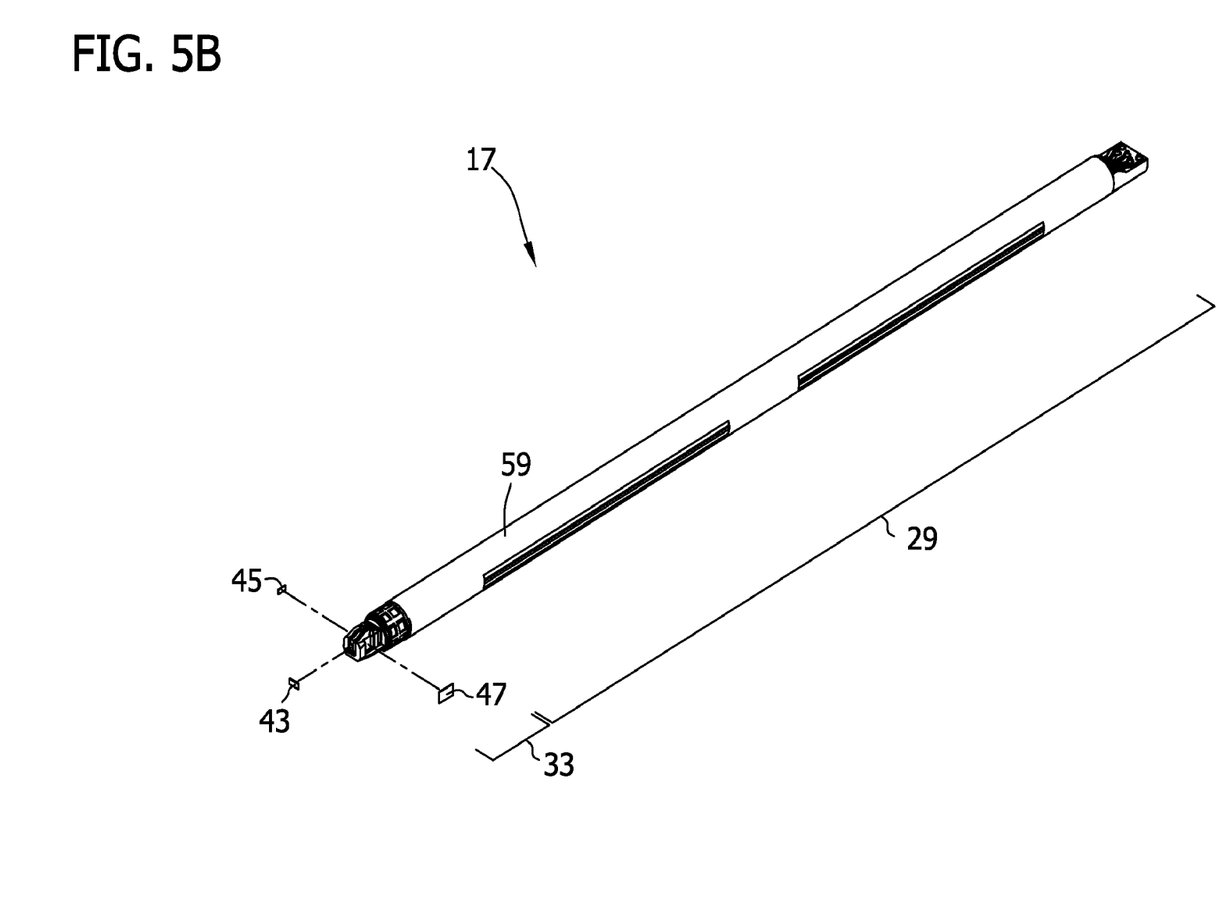
FIG. 5B is a perspective view of a probe for an electronic thermometer wherein electronic components are mounted to a distal portion of the probe, according to an embodiment of the invention.

In an embodiment of the invention illustrated by FIGS. 5A and 5B, the probe 17 further includes a covering 59 for the probe shaft 29 or a portion thereof. The shaft covering 59, such a plastic layer which is molded around the probe shaft 29, encases the conductive traces 39 which are applied to the surfaces of the probe shaft 29. The shaft covering 59 thus protects the conductive traces 39 from being damaged and provides a generally smooth surface for the probe shaft 29. Because the shaft covering 59 leaves the MID of the probe tip 33 exposed, the electronic component(s) (e.g., temperature sensor 43, heater temperature sensor 45, resistor 47) may be attached to the MID after the shaft covering 59 has been molded around the probe shaft 29, as illustrated by FIG. 5B. Thus, the shaft covering 59 can be added to the probe 17 without dislocating the electronic component(s). In an embodiment, the shaft covering 59 is sized and shaped around the probe shaft 29 so that the electrically conductive traces 39 of the probe shaft 29 are located substantially along the longitudinal axis of symmetry (e.g., longitudinal center axis, bending neutral axis) of the shaft covering 59. Locating the electrically conductive traces 39 substantially along the axis of symmetry minimizes stress and breakage of the conductive traces 39 resulting from bending probe 17. FIGS. 5A and 5B also show a receiving element 61, recessed for receiving a flex circuit attachment and providing means for electrically connecting probe 17 to the cord 15 connected to base unit 13. For example, a set of pins of receiving element 61 are soldered to the flex circuit.

In one embodiment, the shaft covering 59 is shaped to include one or more elements for use in securing the probe shaft 29 inside the handle 27. In an alternative embodiment, an element bonded to shaft 29 or integrally formed as part of shaft 29 helps secure the shaft to handle 27. The handle 27 is placed on or around the probe 17 and an adhesive secures the handle 27 to the probe 17. In another example, the covering 59 includes a pair of diametrical wings (not shown) extending radially outward from the proximal end of the probe shaft 29 for securing it within the handle 27. In yet another embodiment, the shaft covering 59 is shaped to provide the handle 27 at the proximal end of the probe shaft 29.

Figure 6A:
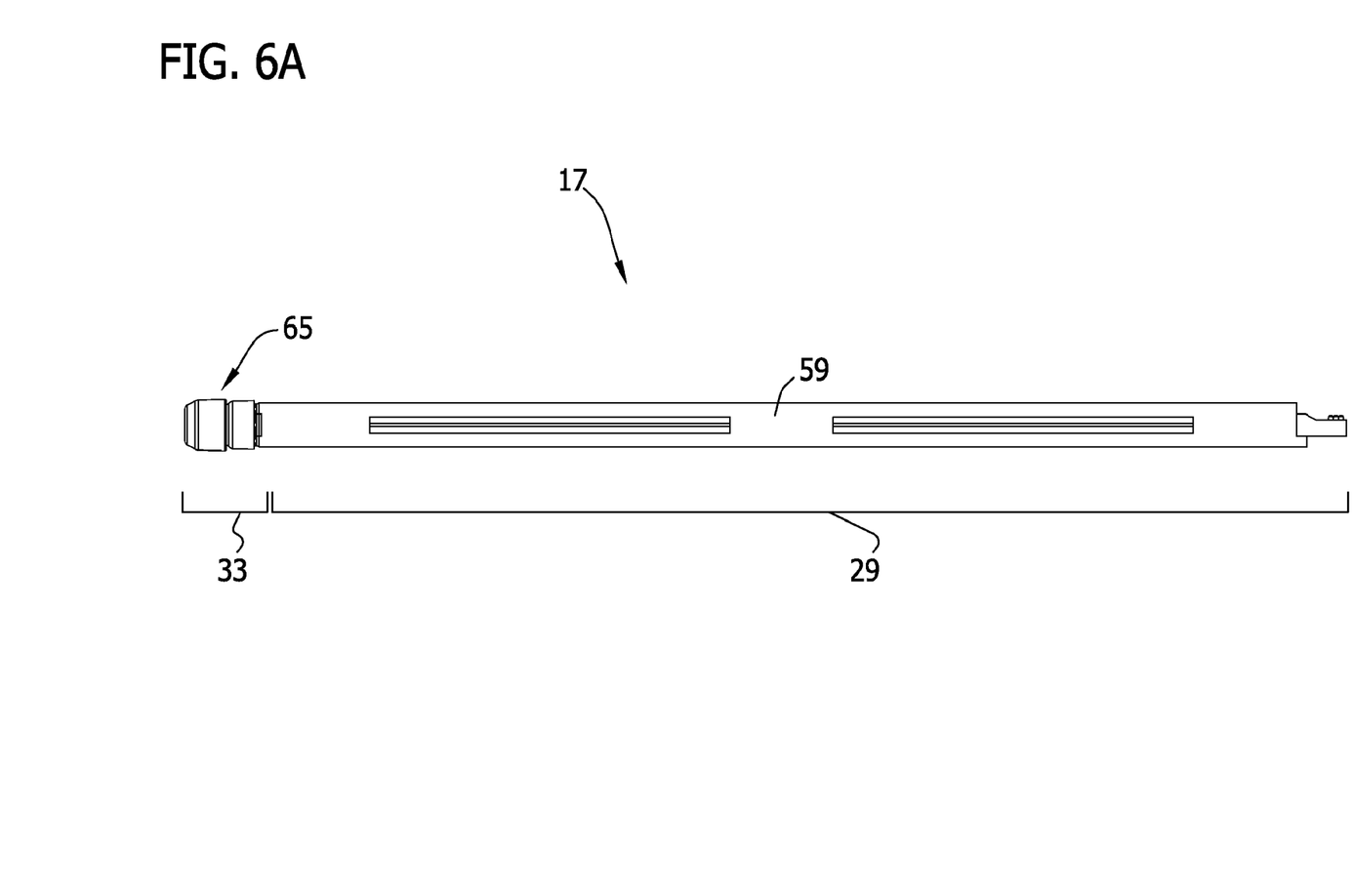
FIG. 6A is a side orthogonal view of a probe for an electronic thermometer wherein the probe has a tip assembly according to an embodiment of the invention.
Figure 6B:
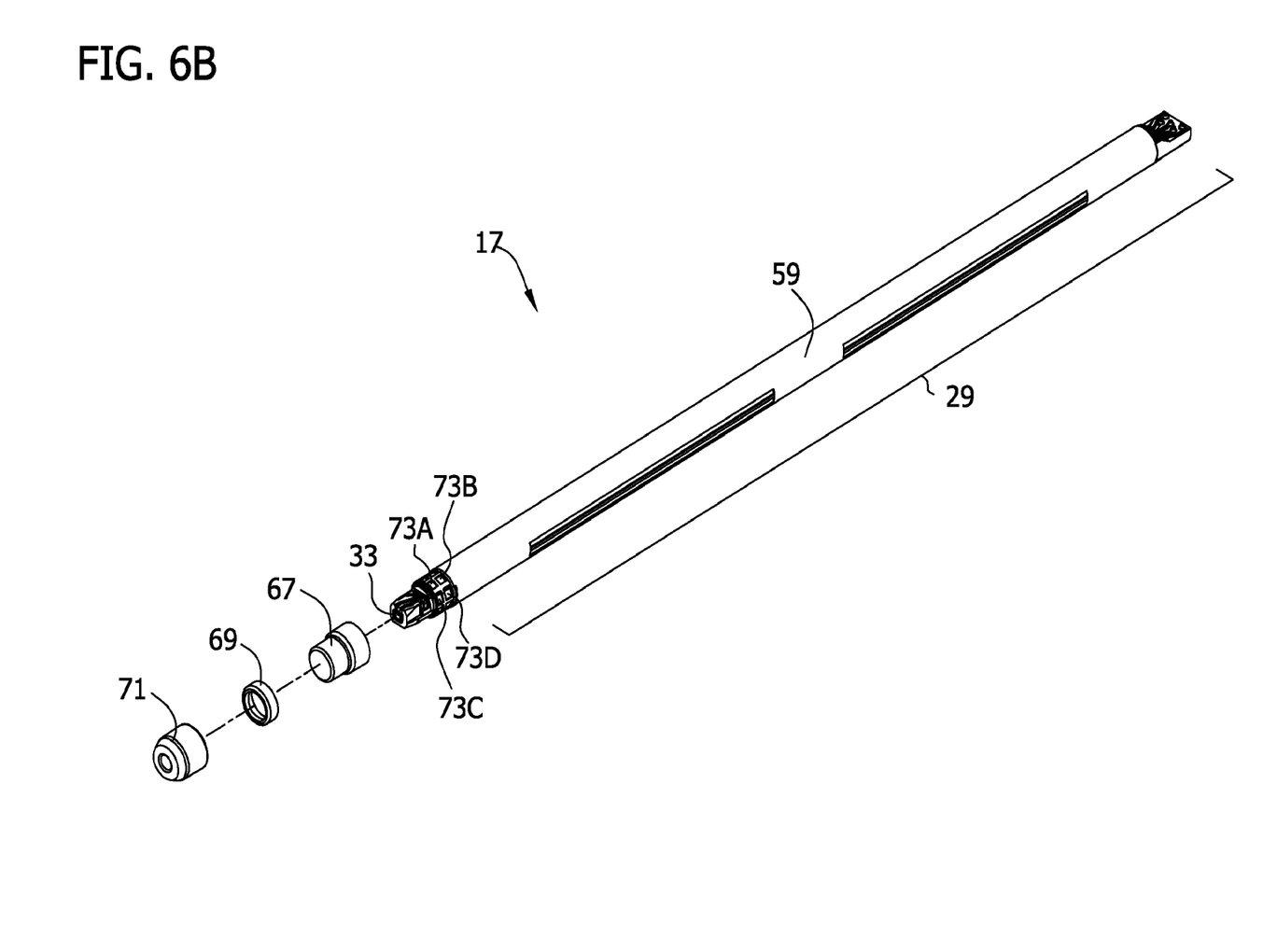
FIG. 6B is a partially exploded side perspective view of a probe for an electronic thermometer wherein the probe has a tip assembly according to an embodiment of the invention

Referring to FIG. 6A, in an embodiment of the invention the probe 17 further includes a tip assembly 65. As illustrated in FIG. 6B, the tip assembly 65 may include one or more of the following components: a separator 67, an isolator 69, and a tip cover 71. The tip cover 71 comprises a thermally conductive material (e.g., aluminum) and is in thermal contact with the temperature sensor 43. For example, in the illustrated embodiment, a portion of the temperature sensor 43 protrudes slightly from the generally rectangular prismatic shape of the probe tip 33. The tip cover 71 receives the probe tip 33 such that the temperature sensor 43 is in thermal contact with the tip cover 71. In an embodiment, a thermally conductive agent (e.g., thermal epoxy) may be applied between the temperature sensor 43 and the tip cover 71 to improve the thermal connection between the temperature sensor 43 and the tip cover 71. The isolator 69 comprises a non-electrically conductive band having relatively poor thermal conductivity (e.g., thermally insulating). The isolator 69 is positioned around the probe tip 33 to minimize thermal communication between the probe tip 33 and other parts of probe 17. Co-assigned U.S. Pat. No. 6,839,651 discloses such an isolator and is incorporated herein by reference. The separator 67 comprises a thermally conductive band positioned around the probe tip 33 so that it is in thermal contact with the heating element 47 and the heater temperature sensor 45. In an embodiment, a thermally conductive agent (e.g., thermal epoxy) may be applied between the temperature sensor 45 and the separator 67 to thermally connect the temperature sensor 45 and the separator 67. The heating element 47 (e.g., resistor) is used to heat the probe 17 to a temperature near the temperature of the object being measured to prevent a part of the probe 17 from acting as a heat sink. The heater temperature sensor 45 is used to sense the temperature of the separator 67 and to generate a signal representative of the heat being provided to the separator 67 by the heating element 47. The signal is communicated via the conductive traces 39 of the MID to the base unit 13 and the base unit 13 controls the heating element 47 accordingly.

Referring further to FIGS. 6A and 6B, in an embodiment, the probe 17 includes a means (e.g., adhesive, collar, reciprocal grooves etc.) for securing the tip assembly 65 to the probe tip 33. For example, the molded plastic substrate 37 of the MID may be particularly shaped to receive the tip assembly 65. According to the illustrated embodiment, the MID includes one or more recesses, such as recesses 73A-73D, which are filled with an adhesive (e.g., non-thermal epoxy, resin). A proximal portion of the separator 67 is fitted over the recesses 73A-73D and is adhered to the MID by the adhesive. In another embodiment, the separator 67 is mounted to the probe shaft 29. In particular, axially spaced apart connection projections (not shown) extending radially inward from an inner surface of the separator 67 are received in corresponding axially spaced pair of grooves formed on the shaft covering 59. The grooves extend partially around a circumference (broadly, a perimeter) of the shaft covering 59 generally traverse to the longitudinal axis of the shaft covering 59. More specifically, each groove extends about 180 degrees around the longitudinal axis of the shaft covering 59 and does not overlap another groove along the longitudinal axis of the shaft covering 59. Epoxy or resin may be applied inside the grooves and/or inside the inner surface of the separator 67 to attach the separator 67 to the shaft covering 59. The grooves prevent the separator 67 from rotating completely (i.e., 360 degrees) around the circumference of the probe as the epoxy or other adhesive is curing and/or drying. It is contemplated that the grooves may extend less than or greater 180 degrees, as long as each groove extends less than 360 degrees around the longitudinal axis of the shaft covering 59. Moreover, the grooves may overlap along the longitudinal axis of the shaft within the scope of the invention.

Figure 7:
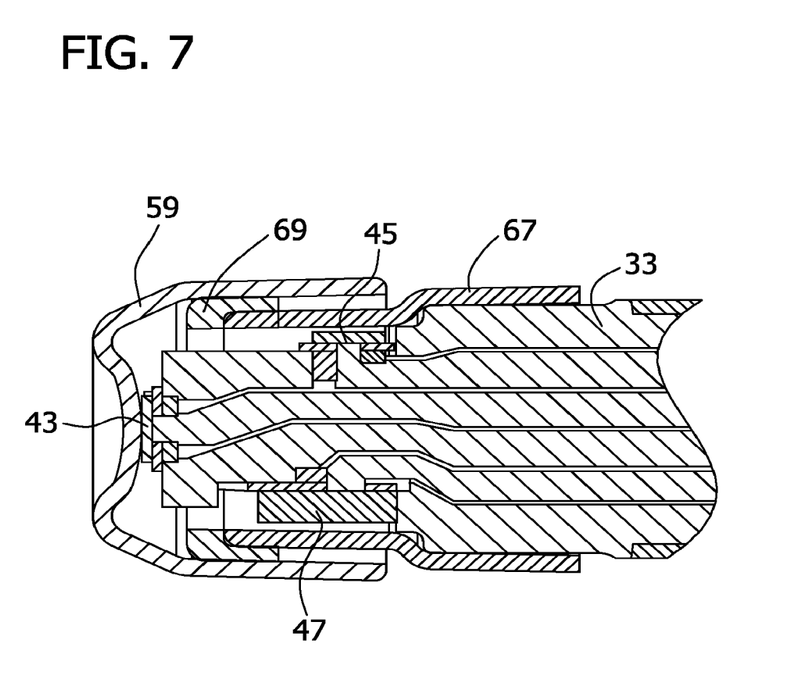
FIG. 7 is a side orthogonal sectional view of a distal portion of a probe for an electronic thermometer according to an embodiment of the invention.

In the embodiment illustrated by FIG. 7, the isolator 69 is mounted to a distal portion of the separator 67 such that the separator 67 and the probe tip 33 are physically connected to the isolator 69 but are not electrically connected to each other. An adhesive (e.g., non-thermal epoxy, resin), for example, adheres the isolator 69 to the distal portion of the separator 67. As illustrated, the tip covering 59 is mounted to a distal portion of the isolator 69. The electronic components, namely heating element 47 and temperature sensors 43, 45, are bonded with electrically conductive epoxy or soldered to shaft 29 in their proper positions on the circuit pads of shaft tip 33. The separator 67 is bonded to shaft tip 33 using non-conductive epoxy. At the same time, thermally conductive epoxy is used to bridge the gap between heating element 47 and temperature sensor 45 to make a thermally conductive path between them and separator 67. In the illustrated embodiment, isolator 69 is pressed onto (i.e., press fit retention) the separator 67. In this manner, isolator 69 thermally and electrically separates the separator 67 from tip 33. Thermally conductive epoxy is applied to temperature sensor 43 to form a thermal path between it and tip 33 when it is installed. The tip 33 is pressed on over isolator 69 until it bottoms out on temperature sensor 43 and is then bonded around the circumference to separator 67 with epoxy sealing the joint from moisture and making a permanent connection between the two parts. This epoxy can be thermally conductive or not.

The present invention further contemplates a method of making the sensor probe 17 described above. The method includes injecting thermoplastic resin into one or more cavities to form a plastic substrate 37. The thermoplastic resin may include plateable resin and or non-plateable resin. Exemplary plateable resins include one or more of the following: polypropylene, acrylonitrile butadiene styrene (ABS), polycarbonate (PC), polysulphone (PSF), polyethersulphone (PES), polyetherimide (PEI), polyphthalamide (PPA), polyetheretherketone (PEEK), liquid crystal polymers (LCP), syndiotactic polystyrene (SPS) etc. Exemplary non-plateable resins include one or more of the following: polyphenylene sulfide (PPS), polyethylene terephthelate (PET), polybutylene terephthalate (PBT), etc. A portion of the plastic substrate 37 including a front surface of the plastic substrate 37 is referred to as a first end margin of the plastic substrate 37. A remaining portion of the plastic substrate 37 including a rear surface of the plastic surface is referred to as the second end margin of the plastic substrate 37. The method also includes applying a conductive circuit pattern 39 to a plurality of surfaces of the plastic substrate 37, thereby forming an MID. Exemplary techniques for applying the conductive circuit pattern 39 include one or more of the following techniques: electroplating, hot-stamping, capture process, transfer process, laser-direct structuring, laser subtractive structuring, and photoimaging, etc. The method further includes attaching (e.g., soldering, adhering, bonding, etc.) the temperature sensor 43 (or another electronic component) to the first end of the plastic substrate 37 such that the temperature sensor 43 is electrically connected to the circuit pattern. The circuit pattern electrically connects the temperature sensor 43 with base unit 13 (e.g., processor) of the electronic thermometer 11.

According to an embodiment, injecting the thermoplastic resin into one or more cavities to form a plastic substrate 37 includes a two-shot process for making an MID. The two-shot process creates a plastic substrate 37 having surfaces comprising plateable and non-plateable plastic, as further discussed below. The areas of the surface comprising the plateable plastic define the circuit pattern 39. According to the embodiment, the conductive circuit pattern 39 is applied by plating the areas of the surface comprising the plateable plastic with one or more conductive materials. Exemplary conductive materials forming the circuit pattern include or more of the following: electroplated copper, tin, lead, nickel, and/or gold; electroless copper and/or nickel; immersion gold and/or tin; silver ink; carbon ink, etc. According to one embodiment, applying the conductive circuit pattern 39 also includes applying a protective overcoat (e.g., nickel, gold, etc.) to the conductive material. According to another embodiment, applying the conductive circuit pattern 39 also includes attaching a receiving mechanism (mounting pads, plug-in contacts, sliding contacts, fastener elements, etc.) to the plastic substrate 37 for receiving electronic components. According to one embodiment, the first end of the plastic substrate 37 includes a recess, pocket, protrusion or other indicator (i.e., positioning element 53, 55) for positioning the temperature sensor 43 (or another electronic component), attaching the component includes locating attaching it according to the indicator.

According to one embodiment utilizing the two-shot process for making an MID, injecting the thermoplastic resin into one or more cavities to form a plastic substrate 37 includes injecting a first shot of plateable resin into a first cavity to form a preliminary plastic substrate 37. The preliminary plastic substrate 37 (or portion thereof) is then introduced into a second cavity. A second shot of non-plateable thermoplastic resin is injected into the second cavity to form the plastic substrate 37. The circuit pattern is defined by areas of the surface of the plastic substrate 37 which are plateable (e.g., not covered by the non-plateable thermoplastic resin). Accordingly, incongruence between the first and second cavities corresponds to the circuit pattern 39. More specifically, when the preliminary plastic substrate 37 having a shape defined by the first cavity is introduced into the second cavity, void(s) are formed between the surface(s) of preliminary plastic substrate 37 and the second cavity. When the second shot of non-plateable thermoplastic resin is injected into the second mold, it bonds only to areas of the surfaces of the preliminary plastic substrate 37 which define the void(s). Thus, the particular circuit pattern 39 is formed from the plateable plastic of the preliminary plastic substrate 37 remaining exposed by the plastic substrate 37.

According to another embodiment utilizing the two-shot process for making an MID, injecting the thermoplastic resin into one or more cavities to form a plastic substrate 37 includes injecting a first shot of non-plateable resin into a first cavity to form a preliminary plastic substrate 37. The preliminary plastic substrate 37 (or portion thereof) is then introduced into a second cavity. A second shot of plateable thermoplastic resin is injected into the second cavity to form the plastic substrate 37. The circuit pattern is defined by areas of the surface of the plastic substrate 37 which are plateable (e.g., formed on the surface of the preliminary plastic substrate 37). Accordingly, incongruence between the first and second cavities corresponds to the circuit pattern 39. More specifically, when the preliminary plastic substrate 37 having a shape defined by the first cavity is introduced into the second cavity, void(s) are formed between the surface(s) of preliminary plastic substrate 37 and the second cavity. When the second shot of plateable thermoplastic resin is injected into the second mold, it bonds only to areas of the surface(s) of the preliminary plastic substrate 37 which define the void(s). Thus, the particular circuit pattern 39 is formed from the plateable plastic bonded to the surface(s) of the preliminary plastic substrate 37.

In one embodiment, the first and second cavities are two separate molds. In another embodiment, the first cavity is a mold having a first shape and the second cavity is the same mold reconfigured to have a second shape. For example, the mold may include a sliding mechanism which is used to change the geometry of the mold cavity between shots. Although not illustrated, those skilled in the art will recognize that the molds defining the first and second cavities will have a reverse construction with respect to the desired shape of molded plastic substrate 37.

According to an embodiment, injecting the thermoplastic resin into one or more cavities to form a plastic substrate 37 includes a one-shot process for making the MID. In particular, plateable thermoplastic resin is injected into a cavity to form the plastic substrate 37. According to the embodiment, the conductive circuit pattern 39 is applied to a plurality of surfaces according to photo-imaging or laser-imaging techniques. For example, the conductive circuit pattern 39 may be applied using a subtractive photo-imaging technique. In particular, an electroless material (e.g., electroless copper) is applied to the plurality of surfaces of the plastic substrate 37. A photosensitive polymer resist is then applied to the plastic substrate 37. The plastic substrate 37 is thereafter exposed to ultra-violet light to selectively harden the resist on areas of the surfaces of the plastic substrate 37 to define the circuit pattern 39. The resist is hardened on areas of the surface which are not included in the circuit pattern 39. The unexposed resist is removed, exposing the circuit pattern comprised of the electroless material. The electroless material is then electroplated with a conductive material (e.g., tin/led, nickel/gold). The hardened resist and electroless material underlying the hardened resist are removed. It will be appreciated that alternative or additional techniques (e.g., additive photo-imaging) may be used to apply the conductive circuit pattern 39 without departing from the scope of the present invention.

According to an embodiment, the described method for making probe 17 further includes introducing at least a portion of the plastic substrate 37 shaft with the conductive circuit pattern 39 applied thereto (e.g., the MID shaft) into an overmold cavity and injecting thermoplastic resin into the overmold cavity. The injected thermoplastic resin bonds to the MID shaft to form casing 59 for the at least portion of the MID shaft. According to one embodiment, the temperature sensor 43 (or another electronic component) is attached to the end/portion of the MID after the formation of the casing 59. Because the temperature sensor 43 is attached to the MID after the formation of the casing 59, the temperature sensor 43 can be accurately located within the probe 17. In particular, the temperature sensor 43 will not be dislocated during the formation of the casing 59. Accordingly, the probe 17 can be consistently constructed to have the temperature sensor 43 accurately located. The first step in constructing this shaft assembly is to mold a base part, namely, substrate 37. Then substrate circuitry, including circuit patterns 39, is applied to shaft substrate 37 and the flex connecting pins are pressed into it. Overmolding substrate 37 forms the outside shape of the shaft 29 in all areas except its distal end margin, namely tip 33.

Although described primarily in the context of an electronic thermometer having a probe in which electronic sensor components are located, it is to be understood that aspects of the invention are useful in constructing various medical devices in which consistent and repeatable component placement are desirable.

The order of execution or performance of the operations in embodiments of the invention illustrated and described herein is not essential, unless otherwise specified. That is, the operations may be performed in any order, unless otherwise specified, and embodiments of the invention may include additional or fewer operations than those disclosed herein. For example, it is contemplated that executing or performing a particular operation before, contemporaneously with, or after another operation is within the scope of aspects of the invention.

When introducing elements of aspects of the invention or the embodiments thereof, the articles "a," "an," "the," and "said" are intended to mean that there are one or more of the elements. The terms "comprising," "including," and "having" are intended to be inclusive and mean that there may be additional elements other than the listed elements.

Having described aspects of the invention in detail, it will be apparent that modifications and variations are possible without departing from the scope of aspects of the invention as defined in the appended claims. As various changes could be made in the above constructions, products, and methods without departing from the scope of aspects of the invention, it is intended that all matter contained in the above description and shown in the accompanying drawings shall be interpreted as illustrative and not in a limiting sense.

What is claimed is:

1. A method of making a sensor probe for an electronic thermometer, said method comprising:
   injecting thermoplastic resin into one or more cavities to form a plastic substrate, at least one of said cavities defining at least one positioning element integrally formed in the plastic substrate at a first end margin thereof;
   forming a conductive circuit pattern directly on a surface of the plastic substrate from the first end margin of the plastic substrate to an opposite second end margin of the plastic substrate;
   positioning a temperature sensor at the first end margin of the plastic substrate relative to the at least one positioning element; and
   mounting the positioned temperature sensor on the plastic substrate, wherein the conductive circuit pattern provides an electrical connection between the temperature sensor and a processor of the electronic thermometer for generating a temperature measurement as a function of a temperature detected by the temperature sensor.

2. The method of claim 1, wherein the probe has a tip and a shaft, said probe shaft including at least the second end margin of the plastic substrate and the conductive circuit pattern formed thereon, and further comprising:
   introducing at least a portion of the probe shaft into an overmold cavity, wherein a void is formed between the probe shaft and the overmold cavity; and
   injecting thermoplastic resin into the overmold cavity, wherein said thermoplastic resin is bonded to at least a portion of a surface of the probe shaft to form a casing therefor.

3. The method of claim 2, wherein the temperature sensor is mounted on the plastic substrate after forming the casing for the at least a portion of the probe shaft.

4. The method of claim 1, wherein the surface of the plastic substrate includes at least one plateable portion and at least one non-plateable portion, and wherein forming the conductive circuit pattern comprises applying a conductive material to the plateable portion of the surface of the plastic substrate.

5. The method of claim 4, wherein injecting thermoplastic resin into one or more cavities to form the plastic substrate comprises
   injecting a plateable thermoplastic resin into a first cavity to form a preliminary plastic substrate having plateable surfaces;
   introducing at least a portion of the preliminary plastic substrate into a second cavity, wherein one or more voids are formed between surfaces of the preliminary plastic substrate and the second cavity;
   injecting a non-plateable thermoplastic resin into the second cavity to form the plastic substrate, said non-plateable thermoplastic resin bonding to the plateable surfaces of the preliminary plastic substrate in a pattern corresponding to the voids.

6. The method of claim 5, wherein the first cavity is a mold having a first shape and the second cavity is said mold reconfigured to have a second shape.

7. The method of claim 4, wherein injecting thermoplastic resin into one or more cavities to form the plastic substrate comprises
   injecting a non-plateable thermoplastic resin into a first cavity to form a preliminary plastic substrate having non-plateable surfaces;
   introducing at least a portion of the preliminary plastic substrate into a second cavity, wherein one or more voids are formed between surfaces of the preliminary plastic substrate and the second cavity; and
   injecting a plateable thermoplastic resin into the second cavity to form the plastic substrate, said plateable thermoplastic resin bonding to the non-plateable surfaces of the preliminary plastic substrate in a pattern corresponding to the voids.

8. The method of claim 7, wherein the first cavity is a mold having a first shape and the second cavity is said mold reconfigured to have a second shape.

9. The method of claim 1, wherein forming the conductive circuit pattern comprises applying at least one conductive trace to the plastic substrate using one or more of the following techniques: electroplating, hot-stamping, capture processing, transfer processing, laser-direct structuring, laser subtractive structuring, and photoimaging.

10. The method of claim 1, wherein the at least one positioning element comprises a recess formed in the plastic substrate, said recess being sized and shaped for receiving the temperature sensor therein, and wherein mounting the temperature sensor comprises locating the recess at the first end margin of the plastic substrate for receiving the temperature sensor and attaching, via an electrically conductive adhesive, the temperature sensor to a receiving surface of the recess.

11. The method of claim 1, wherein the at least one positioning element comprises a protrusion formed in the plastic substrate, said protrusion being sized and shaped for engaging the temperature sensor therein, and wherein mounting the temperature sensor comprises locating the protrusion at the first end margin of the plastic substrate for receiving the temperature sensor and attaching, via an electrically conductive adhesive, the temperature sensor to a receiving surface of the protrusion.

12. The method of claim 1, wherein the one or more cavities define a first positioning element and a second positioning element integrally formed in the plastic substrate.

13. The method of claim 12, further comprising:
positioning a heating element at the first end margin of the plastic substrate relative to the second positioning element; and
mounting the positioned heating element on the plastic substrate.

14. The method of claim 13, further comprising:
receiving an isolator by the first end margin of the plastic substrate, said isolator comprising a thermally insulating material for thermally isolating the first end margin of the plastic substrate from a remainder of the plastic substrate including the second end margin; and
receiving a separator by the first end margin of the plastic substrate, wherein said separator is in thermal contact with the temperature sensor and positioned between the temperature sensor and the isolator.

15. The method of claim 13, wherein the first positioning element is sized and shaped for engaging the temperature sensor, and wherein mounting the temperature sensor comprises locating the first positioning element at the first end margin of the plastic substrate for receiving the temperature sensor and attaching, via an electrically conductive adhesive, the temperature sensor to a receiving surface of the first positioning element.

16. The method of claim 13, wherein the second positioning element is sized and shaped for engaging the heating element, and wherein mounting the heating element comprises locating the second positioning element at the first end margin of the plastic substrate for receiving the heating element and attaching, via an electrically conductive adhesive, the heating element to a receiving surface of the second positioning element.

17. The method of claim 1, wherein the probe has a probe tip and a probe shaft, said probe shaft including an electrical conductor electrically conducted both to the conductive circuit pattern formed on the plastic substrate at the second end margin thereof and to the processor for electrically connecting the temperature sensor to the processor.

18. The method of claim 17, further comprising encasing at least a portion of the plastic substrate at the second end margin with a probe shaft cover while exposing at least a portion of the plastic substrate at the first end margin.

19. The method of claim 18, wherein the probe shaft cover comprises a molded plastic layer.

20. The method of claim 17, further comprising encasing at least a portion of the plastic substrate at the first end margin and the temperature sensor mounted thereon with a probe tip cover, said probe tip cover comprising a thermally conductive material, wherein said probe tip cover is in thermal contact with the temperature sensor when encasing the temperature sensor.

* * * * *